United States Patent Office 2,926,158
Patented Feb. 23, 1960

2,926,158

SULFUR-CONTAINING PRODUCTS AND THEIR PREPARATION

Robert W. Martin, Lafayette, Calif., assignor to Shell Development Company, New York, N.Y., a corporation of Delaware No Drawing. Application November 21, 1955
Serial No. 548,243

14 Claims. (Cl. 260—79)

This invention relates to a new class of sulfur-containing products. More particularly, the invention relates to novel products containing a plurality of aromatic rings separated by sulfur-containing aliphatic bivalent radicals, to a method for preparing these products from substituted poly(hydrocarbyl)benzenes, and to the use of the products, particularly in the preparation of synthetic fibers and surface coatings.

Specifically, the invention provides new and particularly useful sulfur-containing products possessing at least one benzene ring substituted on at least 3 and preferably 4 of the ring carbon atoms with separate hydrocarbon radicals and is substituted on at least two of the remaining ring carbon atoms with separate aliphatic open-chain radicals containing a member of the group consisting of —S—, —SO— and —SO$_2$— groups. As a special embodiment, the invention provides mercapto-substituted polythioethers of the formula

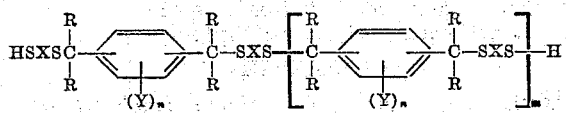

wherein Y is a monovalent hydrocarbon radical, X is a bivalent organic radical, and preferably an alkylene radical, R is hydrogen or a hydrocarbon radical, n is 3 or 4 and m is an integer from 0 to 50.

The invention further provides a novel process for preparing the above-described sulfur-containing compounds. The polythio ethers are prepared by heating and reacting a substituted hydrocarbyl benzene of the group consisting of poly(halohydrocarbyl) poly(hydrocarbyl) benzenes and poly(acyloxyhydrocarbyl) poly(hydrocarbyl) benzenes, with appropriate amounts of a material having at least two mercapto hydrogen atoms, such as hydrogen sulfide or polymercaptans. The above-described sulfinyl and sulfonyl-substituted products are obtained by treating the corresponding thio-containing products with an oxidizing agent.

It is an object of the invention to provide a new class of sulfur-containing products. It is a further object to provide new products containing a plurality of aromatic rings separated by sulfur-containing aliphatic bivalent radicals, and a method for their preparation. It is a further object to provide new sulfur-containing resinous products having fiber-forming properties. It is a further object to provide high molecular weight sulfur-containing products which can be melt spun into fibers having good strength and solvent resistance. It is a further object to provide resinous products that can be spun into fibers having good dielectric properties. It is a further object to provide new sulfur-containing resinous products which are useful in the preparation of improved surface coating compositions. It is a further object to provide new cross-linked sulfur-containing resinous products which are useful in the preparation of plastics. It is a further object to provide a new method for preparing fiber-forming resins from substituted polyhydrocarbyl benzenes. Other objects and advantages of the invention will be apparent from the following detailed description thereof.

It has now been discovered that these and other objects may be accomplished in part by the novel sulfur-containing products of the present invention which possess at least one and preferably two or more benzene rings substituted on from 3 to 4 of the ring carbon atoms with separate hydrocarbon radicals and substituted on at least two of the remaining ring carbon atoms with separate aliphatic open chain radicals containing a member of the group consisting of —S—, —SO— or —SO$_2$— groups, and preferably mercapto-substituted polythioethers of the formula

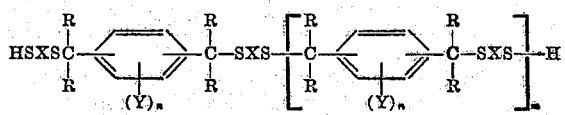

These new products, due to their unique structural features, such as having the benzene rings with substantially and preferably all of their ring carbon atoms attached to carbon atoms, have been found to have many unusual and unexpected properties. It has been found, for example, that the products having relatively high molecular weights and preferably having the sulfur-containing radicals attached to the 1 and 4 positions of the benzene ring can be melt spun to form fibers which are strong and have excellent resistance to conventional solvents such as alcohols, ketones and aromatic hydrocarbons. Those prepared from the lower alkanedithiols of even number of carbon atoms also have resistance to action of the powerful chlorine-containing solvents. The presence of the substantially complete substituted aromatic rings gives all of the fibers unexpected durability and resistance to deteriorating reactions which involve the hydrogen atoms on the aromatic ring.

It has also been found that the above-described products of the present invention are of great value in the preparation of improved surface coating compositions. The new products may be formed into coatings by melting or by dissolving in suitable solvents, such as polychlorinated compounds as dichlorobenzene and tetrachloroethane and this mixture spread out on the desired surface. The resulting coatings when dried are hard and durable.

The above-described novel sulfur-containing products wherein the sulfur is in the form of thio linkages are prepared according to the present invention by heating and reacting a substituted hydrocarbyl benzene of the group consisting of poly(halohydrocarbyl)poly(hydrocarbyl)benzenes and poly(acyloxyhydrocarbyl)poly(hydrocarbyl)benzenes with appropriate amounts of a material having at least two mercapto hydrogen atoms, such as hydrogen sulfide or polymercaptans. The sulfinyl and sulfonyl-containing resinous products are obtained by treating the corresponding thio-containing resinous products with an oxidizing agent. It was quite unexpected to find that fiber-forming resinous products could be obtained by this method as it has been found that when other substituted aromatic compounds, such as bis(chloromethyl)benzene are reacted with the polymercaptans, there is a tendency for the mixture to gel without formation of the desired linear polymer. When one utilizes the above-described polyhydrocarbyl-substituted benzene there is no gelation and the desired fiber-forming polymeric materials are obtained very easily.

The poly(halohydrocarbyl)poly(hydrocarbyl)benzenes that may be used in the process of the invention may be exemplified by the following:

1,4-bis(chloromethyl) tetramethylbenzene,
1,4-bis(1-chloroethyl) tetraethyl benzene, 1,3-bis(1-bromoethyl) tetrabutylbenzene,
1,2-bis(1-chlorobutyl) tetraoctylbenzene,
1,4-bis(1-chloropentyl) tetramethylbenzene,
1,3-bis(chloromethyl) tetradecylbenzene,
1,4-bis(chloromethyl) dibutyl dioctylbenzene,
1,3-bis(1-chloropentyl) dichlorohexyl didecylbenzene, and
1,4-bis(chloromethyl) dihexenyl dioctyl benzene.

Preferred poly(halohydrocarbyl)poly(hydrocarbyl)-benzenes to be employed in the process include those compounds having a benzene ring substituted, in the 1,4 positions, with two chloro-substituted aliphatic hydrocarbon radicals which have the chlorine atom on the alpha carbon atom and preferably contain no more than 6 carbon atoms, and the remaining ring carbon atoms substituted with four separate hydrocarbon radicals which are preferably alkyl, cycloalkyl, alcycloalkyl and alkenyl radicals containing no more than 10 carbon atoms. Particularly preferred are the bis(chloromethyl) tetraalkylbenzenes.

The poly(halohydrocarbyl)poly(hydrocarbyl)benzenes may be obtained by halogenating a poly(hydrocarbyl)benzene by conventional methods. Bis(chloromethyl) tetramethylbenzene is prepared, for example, by chlorinating hexamethylbenzene. The preferred bis-(chloromethyl) hydrocarbyl benzenes are preferably obtained by reacting the poly(hydrocarbyl)benzenes having at least two ring carbon atoms unsubstituted, such as tetramethylbenzene (durene), with formaldehyde and hydrogen chloride. The poly(hydrocarbyl)benzenes may be obtained by alkylating benzene with the desired hydrocarbon in the presence of an alkylating agent, such as hydrogen fluoride, as described in U.S. 2,275,312.

The poly(acyloxyhydrocarbyl)poly(hydrocarbyl)benzenes that are used in the process of the invention may be exemplified by the following:

1,4-bis(acetoxymethyl) tetramethylbenzene,
1,3-bis(acetoxymethyl) tetrabutylbenzene,
1,2-bis(1-acetoxyethyl) tetraoctylbenzene,
1,4-bis(propanoyloxymethyl) tetraethylbenzene,
1,3-bis(propanoyloxymethyl) tetradecylbenzene,
1,3-bis(1-acetoxybutyl) tetrahexylbenzene,
1,4-bis(propanoyloxymethyl) tetracyclohexylbenzene, and
1,3-bis(propanoyloxymethyl) tridecyl benzene.

Preferred poly(acyloxyhydrocarbyl)poly(hydrocarbyl) benzenes that may be used in the process of the invention include those compounds having a benzene ring substituted, on the 1,4-positions, with two alkanoyloxy-substituted aliphatic hydrocarbon radicals which have the alkanoyloxy group substituted on the alpha carbon atom and preferably contain no more than 6 carbon atoms, with the alkanoyloxy group containing no more than 3 carbon atoms, and the remaining ring carbon atoms substituted with four separate hydrocarbon radicals which are preferably alkyl, cycloalkyl, alkcycloalkyl and alkenyl radicals containing no more than 10 carbon atoms. Particularly preferred are the 1,4-bis (alkanoyloxymethyl) tetraalkyl benzenes.

The above-described poly(acyloxyhydrocarbyl) poly (hydrocarbyl)benzenes are preferably obtained by reacting one of the above-described polyhalohydrocarbyl substituted benzenes with a salt of the appropriate acid. Bis(acetoxymethyl) tetramethylbenzene, for example, is obtained by reacting bis(chloromethyl) tetramethylbenzene with a silver or sodium salt of acetic acid.

The material to be reacted with the above-described aromatic derivatives comprise the material or materials having at least two mercapto hydrogen atoms. This includes hydrogen sulfide as well as the polymercaptans. The polymercaptan may be aliphatic, cycloaliphatic, aromatic or heterocyclic, saturated or unsaturated and may be monomeric or polymeric. In addition, they may, and preferably do in some instances, contain sulfur and/or oxygen ether linkages within their molecule, and may be substituted with substituents, such as, for example, halogen atoms and the like.

The monomeric polymercaptans may be exemplified by 1,2-ethanedithiol,
1,5-pentanedithiol,
1,4-butanedithiol,
1,4-cyclohexanedithiol,
1,2,4-butanetrithiol, dimercapto diethylformal
$$(HSC_2H_4OCH_2OC_2H_4SH)$$
1,6-decanedithiol,
3,3'-thiodipropanethiol,
4,4'-thiodihexanethiol,
3,3'-oxydipropanethiol,
1,6-octenedithiol,
1,3-benzenedithiol,
1,4-benzenedithiol,
1,3,5-benzenetrithiol,
4,4'-diphenyldithiol,
2-chloro-1,5-benzenedithiol,
tetrahydropyran-2,3-dipropanethiol,
dihydrofuran-2,5-dibutanethiol,
sulfolane-2,5-dihexanethiol,
furan-2,5-dibutanethiol,
2-octene-1,5-dithiol, and the like.

Preferred monomeric-type polymercaptans to be used in the process comprise the aliphatic dithiols containing from 2 to 18 carbon atoms and the heterocyclic dithiols containing from 7 to 20 carbon atoms. Particularly preferred polythiols are the alkane-dithiols and alkene-dithiols containing from 2 to 15 carbon atoms, the thiodialkanethiols, thiodialkenthiols, oxydialkanethiols, and oxydialkenethiols containing from 2 to 16 carbon atoms, and the heterocyclic polythiols of the formula $$HSRXRSH$$

wherein X is a furan, dihydrofuran, tetrahydrofuran, pyran, dihydro pyran and tetrahydropyran ring on their substituted derivatives and R is a bivalent aliphatic hydrocarbon radical.

Coming under special consideration, particularly because of the fine fiber-forming properties of the resulting reaction products, are the alkanedithiols, thiodialkanethiols and oxydialkanethiols containing 4 to 14 carbon atoms, and particularly from 4 to 10 carbon atoms.

Polymeric-type polymercaptans may also be used in producing the novel products of the invention. One group of this type of polymercaptans comprise the polythiopolymercaptans obtained by treating polymercaptans, such as those described above, with agents, such as hydrogen peroxide or sodium peroxide. Polymers of the formula $$HS(C_2H_4OCH_2OC_2H_4SS)C_2H_4OCH_2OC_2H_4SH$$

may be obtained, for example, by reacting dimercapto diethyl formal with hydrogen peroxide. A more detailed description of the preparation of this type of polymer may be found in Patrick, U.S. 2,466,963.

Polythiopolymercaptans useful in the process of the invention may also be prepared by reacting an organic dihalide with sodium polysulfide to form a high molecular weight polymer containing a plurality of disulfide linkages and then depolymerizing or degrading that polymer, preferably by treating a water dispersion of the polymer with sodium hydrosulfide and sodium sulfite. Organic halides used for this purpose may be exemplified by ethylene dichloride, propylene dichloride, dichlorobutane, triglycol dichloride, glycerol dichlorohydrin, dichloroethyl formal, dichlorobutyl ether, dichloroethyl ether, dichloropropionic acid, and mixtures thereof. The molecular weight of the resulting polythiopolymercaptan may be controlled by regulating the proportions of reactants. A more detailed description of the preparation of these polymers may be found in Patrick, U.S. 2,466,963.

Polythiopolymercaptans having molecular weights below about 20,000 and preferably below 12,000 are generally preferred. Particularly preferred polythiopolymercaptans are the liquid polythiopolymercaptans having a molecular weight between 300 and 4000.

Of special interest, are the liquid polythiopolymercaptans prepared by reacting dichloroethyl formal, preferably in the presence of small quantities, e.g., 1%, 2% or 3%, of trifunctional products as trichloropropane, with sodium polysulfide and then treating a water dispersion of the polymer with sodium hydrosulfide and sodium sulfite to give products of a molecular weight between 300 and 10,000 and more preferably between 300 and 4000.

Still another type of polymercaptans that can be used to produce the novel products comprise the polymercaptans obtained by reacting a polyepoxide with an excess of hydrogen sulfide. Polyepoxides that may be used for this purpose include those materials having at least two 1,2-epoxy groups, i.e.,

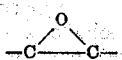

groups, such as vinyl cyclohexene dioxide,
epoxidized soyabean oil,
butadiene dioxide,
1,4-bis(2,3-epoxypropoxy)benzene,
1,3-bis(2,3-epoxypropoxy)benzene,
diglycidyl ether of 2,2-bis(4-hydroxyphenyl) propane,
diglycidyl ether of resorcinol,
diglycidyl ether of catechol,
diglycidyl ether of hydroquinone and their corresponding higher molecular weight product, polyallyl glycidyl ether, polyglycidyl ether, copolymers of allyl glycidyl ether and other ethylenically unsaturated monomers, and the like, and mixtures thereof.

The preparation of several of the polymeric polymercaptans derived from polyepoxides as indicated above is illustrated below:

POLYMERCAPTAN A

About 200 parts of a diglycidyl ether of 2,2-bis(4-hydroxyphenyl) propane having a molecular weight of about 350 and an epoxy value of 0.50 eq./100 g. was dissolved in 300 parts of toluene and this mixture was placed in a stainless steel vessel equipped with a water-jacket reflux condenser. Hydrogen sulfide was then bubbled through the solution to displace the air. The outlet valve was then closed and hydrogen sulfide pressure applied. A pressure of about 50 p.s.i. was reached and then the system was closed. At the conclusion of the reaction, the mixture was found to contain a resinous precipitate. This precipitate was extracted with hot toluene and when dried in a heated force draft at 180° C. was a very viscous liquid.

POLYMERCAPTAN B

The above preparation process was repeated with the exception that the diglycidyl ether of 2,2-bis(4-hydroxyphenyl) propane was replaced with an equivalent amount of poly(allyl glycidyl ether) having an epoxy value of .545 eq./100 g. The resulting product was a heavy viscous liquid having approximately 4 to 5 free mercapto groups, M.W. 1320, .59 eq./100 g. of hydroxyl groups.

As indicated above, the reaction between the substituted benzenes and the material having the active mercapto hydrogen atoms may be accomplished by heating the two components together. The reaction between the poly(acyloxyhydrocarbyl)poly(hydrocarbyl)benzene may in a few cases be relatively slow. In those instances it is usually desirable to increase the reaction rate by the addition of acidic catalysts, such as p-toluenesulfonic acid, hydrogen chloride and the like, in amounts preferably varying from about .1% to 3% by weight.

The proportions in which the substituted benzene and the material having the active mercapto hydrogen atoms are combined may vary over a wide range depending upon the type of product desired. The high molecular weight fiber-forming products are obtained by combining the reactants in approximately chemical equivalent amounts. The expression "chemical equivalent amounts" as used herein in relation to the amount of substituted benzene and the material having the active mercapto groups refers to that amount of the substituted benzene needed to furnish one halohydrocarbyl group or acyloxyhydrocarbyl group for every mercapto hydrogen atom. Preferably, such high molecular weight products are obtained by combining the materials in a chemical equivalent ratio varying from about 1.2:1 to 1:1.2, but preferably at 1:1.

If lower molecular weight products terminated with the mercapto groups are desired, one employs the material having the active mercapto hydrogen atoms in excess and preferably in amounts varying from 1.8 to 5 times the chemical equivalent amount. If lower molecular weight products terminated with the halohydrocarbyl or acyloxyhydrocarbyl radicals are desired, one should employ the substituted benzenes in excess and preferably in amounts varying from 1.8 to 5 times the chemical equivalent amount.

The reaction may be accomplished by merely heating the components together as exemplified by the fusion technique in some of the examples at the end of the specification, or by use of solvents as shown in the other examples. If solvents or diluents are employed, they are preferably the polyhalogenated hydrocarbons, such as tetrachloroethane, hexachloropropane and carbon tetrachloride. Chlorinated aromatic compounds as di- and trichlorobenzene are particularly preferred as solvents.

The temperature used to effect the reaction may also vary over a considerable range. In general, temperatures employed in the process will vary from about 50° C. to about 250° C. If one or more of the reactants are solids or semi-solids, the higher reaction temperatures, such as 125° C. to 225° C. may be needed to melt the solid reactants. Preferred temperatures generally range from about 100° C. to 250° C. Pressures employed may be atmospheric, subatmospheric or superatmospheric as desired or necessary.

The resinous products produced by the above process may be recovered by any conventional method. They are preferably recovered as bottoms product by stripping off the solvent and any excess reactants or by precipitation in a non-solvent.

The sulfinyl and/or sulfonyl-containing resinous products of the present invention are obtained by oxidizing the above-described thio-containing resinous products. Complete oxidation of the thio groups produces the sulfonyl-containing resinous products, while partially controlled oxidation produces the corresponding sulfinyl substituted products.

The oxidation of the thio group may be effected by any of a large number of oxidizing agents, such as hydrogen peroxide, sodium perbenzoate and perbenzoic acid. The amount of the oxidizing agent to be employed will vary over a considerable range. If the sulfinyl-containing product is desired, it is generally desirable to react the thio-containing resinous product with an approximate chemical equivalent amount of the oxidizing agent. As herein, in relation to the oxidation of thio groups to sulfinyl or sulfonyl groups, the expression, "chemical equivalent amount" refers to the amount of agent necessary to furnish one atom of oxygen for every thio group to be oxidized. Preferably, the thio-containing resinous product and the oxidizing agent are reacted in chemical equivalent ratios of 1:1 to 1:1.5, respectively. If the sulfonyl-containing resinous product is desired, the thio-containing resinous product is treated with at least twice the chemical equivalent amount of the oxidizing agent. Preferably, the thio-containing product and agent are reacted in chemical equivalent ratios varying from 1:2 to 1:3, respectively.

The oxidation may be accomplished in the presence or absence of solvents or diluents. Examples of suitable diluents are glacial acetic acid, propionic acid, chloroform, and the like.

The temperature employed during the oxidation may vary over a considerable range depending upon the type of reactants and oxidizing agents employed. It is generally desirable to maintain the temperature between 50° C. and 150° C., preferably between 60° C. and 100° C. Cooling may be employed if necessary. Atmospheric, superatmospheric or subatmospheric pressures may be employed as desired.

The sulfinyl and/or sulfonyl-containing resinous products may be recovered by the bottoms product on stripping off the solvent and any decomposition products of the oxidizing agent.

The polymeric sulfur-containing products produced by the above process will contain reoccurring units having the structure

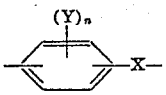

wherein Y is a monovalent hydrocarbon radical, $n$ is 3 to 4, and X is a bivalent aliphatic radical containing at least one and preferably two or more members of the group consisting of —S—, —SO— and —SO$_2$—. Preferred resinous products are those of the formula

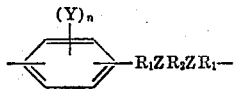

wherein Y is a hydrocarbon radical, $n$ is 3 to 4, R$_1$ and R$_2$ are bivalent aliphatic radicals, and preferably bivalent aliphatic hydrocarbon radicals, and Z is a —S—, —SO— or —SO$_2$— group. The Y in the above-described formula may be an aliphatic, cycloaliphatic or aromatic radical, such as, for example, methyl, ethyl, butyl, hexyl, octyl, isopropyl, isobutyl, isooctyl, decyl, dodecyl, hexadecyl, octadecyl, allyl, 3-octenyl, 4-hexenyl, cyclohexyl, cyclopentyl, cyclopentenyl, phenyl, methylphenyl, isopropylphenyl, and the like. Y is preferably an aliphatic hydrocarbon radical, and particularly an alkyl or cycloalkyl radical containing no more than 14 carbon atoms, and preferably not more than two of the Y's contain over 8 carbon atoms.

The R$_1$ radicals of the above-described unit may be any bivalent aliphatic radical, but is preferably a bivalent aliphatic hydrocarbon radical, such as an alkylene radical having the two valence bonds on the alpha carbon atom, such as methylene, 1,1-propylene, 1,1-isobutylene, 1,1-hexylene, 1,1-octylene and the like. Preferably the R$_1$ radicals contain not more than 6 carbon atoms.

The R$_2$ of the above described unit is a bivalent aliphatic radical obtained by removing the two mercapto groups of the above-described polymercaptans used in preparing the resinous products and is preferably an aliphatic hydrocarbon radical containing up to about 12 carbon atoms.

Especially preferred polymeric products are those of the formula

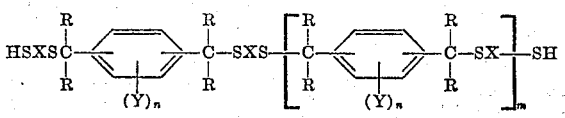

wherein Y is a monovalent hydrocarbon radical, and preferably an alkyl radical, X is a bivalent radical, and preferably an alkylene radical containing up to 10 carbon atoms, R is hydrogen or a hydrocarbon radical as an alkyl radical, $n$ is 3 to 4 and $m$ is an integer from 3 to 50 and preferably 4 to 45.

The preferred monomeric sulfur-containing products are those of the formula

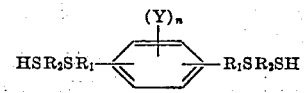

wherein Y is a hydrocarbon radical as described above, $n$ is 3 to 4 and R$_1$ and R$_2$ are as described above.

Examples of such monomeric products include, among others, 1,4-bis(7-mercapto-2-thiaheptyl) tetramethylbenzene,
1,4-bis(6-mercapto-2-thiahexyl) ethyl trimethylbenzene,
1,4-bis(5-mercapto-2-thiapentyl) tetraethylbenzene,
1,4-bis(7-mercapto-2-thiaheptyl) tetrabutylbenzene,
1,3-bis(6-mercapto-2-thiahexyl) decyl trimethylbenzene,
1,3-bis(5-mercapto-2-thiapentyl) trimethylbenzene, and
1,4-bis(4-mercapto-2-thiabutyl) tetramethylbenzene.

The products of the present invention are thick viscous liquids to solids depending on molecular weight. The higher polymers are insoluble in solvents, such as alcohols, ketones and hydrocarbons, but are soluble in polychlorinated compounds, such as dichlorobenzene, chloroform and tetrachloroethane. The products prepared from the lower alkanedithiols, particularly those below butanedithiol show increased resistance to attack even by these chlorinated materials.

The new products having molecular weights of at least 3,000 and preferably between 10,000 and 50,000 can be spun into fibers. The fibers prepared from the resins having molecular weights at the lower range are not as strong and lack the flexibility of those prepared from the higher molecular weight products but they may be used for certain applications which do not require these properties. Those fibers prepared from the higher molecular weight products, e.g., those having molecular weight above about 10,000 and preferably those prepared from the substituted benzenes having the chloro- and acyl-substituted radicals in the 1,4 positions can be cold drawn to form filaments which are very pliable, strong and have good dielectric properties and excellent resistance to solvents, such as alcohols, ketones and hydrocarbons, and if prepared from the lower alkanedithiols, have resistance to the chlorinated solvents. The spinning of these materials may be carried out by a variety of methods known to the workers in the art. For example, the resinous products may be melted and then touched with a rod to draw away a filament. The properties of the high molecular weight resins of the invention make it possible to obtain fine filaments as fine as 0.1 mm. or less.

The lower molecular weight products may be further reacted with substituted benzenes and/or material containing active mercapto hydrogen atoms so as to build up the molecular weight of the product to a point where it may be used in the formation of fibers and filaments. The reactants used in this building up process may be the same or different than those used in making the original product. If the reactants are different, the finished fibers will have a block copolymer type structure. It has been found that this latter technique is very useful in preparing resinous products having many specialized properties, such as superior hardness, greater flexibility, etc., and it is generally preferred for some applications.

In addition to their fiber-forming properties, the resinous products of the invention may be used in the preparation of coating and impregnating compositions. In these applications, they may be applied as a melt or may be dissolved in suitable solvents, such as polychlorinated materials, as chloroform, dichlorobenzene, tetrachloroethane and the like, and mixtures thereof. Other high molecular weight resinous film-forming materials compatible therewith may also be employed in the preparation of such compositions. The resulting compositions may be painted, sprayed or otherwise applied to suitable surfaces such as metals and wool.

To illustrate the manner in which the invention may be carried out, the following examples are given. It is to be understood, however, that the examples are for the purpose of illustration and the invention is not to be regarded as limited to any of the specific materials or conditions recited therein.

Example I

This example illustrates the preparation and properties of a resinous polythiopolymercaptan by reacting 1,5-pentanedithiol with 1,4-bis(chloromethyl) tetramethylbenzene.

A four necked flask was equipped with a stirrer, thermometer, gas inlet tube and heating mantel. A distilling head was also attached to the flask. The head was vacuum jacketed and was equipped with a water cooled portion for condensation of vapors. The liquid condensate could be returned to the kettle or withdrawn in any ratio desired.

The kettle was charged with 34.68 parts of 1,4-bis(chloromethyl) teramethylbenzene, 20.90 parts of 1,5-pentanedithiol and 50 parts of 1,2,4-trichlorobenzene. Nitrogen that had been scrubbed to remove oxygen was introduced into the kettle below the surface of the liquid during the entire period of reaction. The reaction mixture was stirred and heated a total of 5¾ hours. The kettle temperature was kept between 165–179° C. for the major part of the reaction. During the course of the reaction, two 5 part portions of 1,1,2,2-tetrachloroethane were added to the kettle. There was a very vigorous evolution of hydrogen chloride during the first 2 hours. The rate then gradually tapered off. The solution was water white at first but darkened as the reaction proceeded until it was a light brown color when the reaction was stopped.

At the end of the reaction period a marked increase in the viscosity of the solution as compared to that of the original reaction mixture was noted.

When the reaction was stopped, the reaction mixture was diluted with 50 parts of tetrachloroethane. The hot solution was poured with vigorous stirring into 2000 parts of a 1:1 solution of methyl ethyl ketone and acetone. The fibrous precipitate was collected and boiled with acetone. It was again collected and dried. The resin was a pale tan colored, fibrous looking solid. The resin formed a viscous melt when heated at 230° C. By touching a rod to the melt and pulling away, fibers were easily formed. The fibers were easily cold drawn and showed the typical "knecking down" phenomena that accompanies the cold drawing of high molecular weight linear polymers. The drawn fibers were tough and flexible and could be tied into hard knots. The fibers had a tensile strength between 10,200 and 13,800 p.s.i. The polymer was soluble in chloroform and tetrachloroethane.

To further purify the resin was dissolved in chloroform. The chloroform was treated with fuller's earth and the solution was filtered. The solution was poured with rapid stirring into methyl ethyl ketone. A very fine precipitate was formed having M.P. 150–160° C. The precipitate was dried and fused into sheets and the fused resin had a brown color.

Analysis of the purified polymer gave the following results:

S=21.2%, calc.=21.8%
C=68.9%, calc.=69.4%
H=9.0%, calc.=8.9%
Cl=0.58%, calc.=0.0%
Molecular weight=16,087

The calculations are based on polymer having repeating units shown below

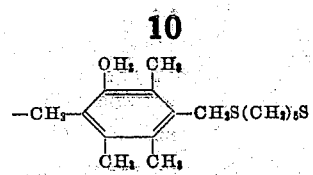

Example II

This example illustrates the preparation and properties of a resinous polythiopolymercaptan by reacting 1,4-butanedithiol with 1,4-bis(chloromethyl) tetramethylbenzene.

The apparatus used in this experiment was the same as that described in Example I. 19.44 parts of 1,4-butanedithiol, 34.65 parts of 1,4-bis(chloromethyl) tetramethylbenzenet and 60 parts of trichlorobenzene were added to the reaction kettle. Nitrogen was introduced into the kettle below the surface of the liquid during the reaction. The reaction mixture was stirred and heated at a kettle temperature of about 131° C. to 173° C. There was a vigorous evolution of hydrogen chloride during the first few hours and then the rate gradually tapered off. 1 part of 1,4-butanedithiol was added after about 6 hours of heating. After about 10 hours of heating, the reaction was terminated. The mixture was diluted with an equal amount of tetrachloroethane and then poured into 2000 part portion of acetone. A snow white crystal-like polymer precipitated out. This material was washed twice in hot toluene and then filtered dry. The softening point was 194° C. and the clear melting point was 209–214° C. Analysis indicated the polymer had a molecular weight of 17,330; sulfur content of 22.3% and chlorine of 0.05%. The polymer could be drawn into a strong fiber when drawn immediately after cooling. When the polymer was melted down and quenched immediately in cold water, it formed an almost colorless film.

Example III

This example illustrates the preparation of a resinous polythiopolymercaptan from a mixture of 1,5-pentanedithiol and 1,4-butanediol and 1,4-bis(chloromethyl) tetramethylbenzene.

The apparatus used in this experiment was the same as that shown in Example I. 4.09 parts of 1,5-pentanedithiol, 14.96 parts of 1,4-butanedithiol, 34.68 parts of 1,4-bis(chloromethyl) tetramethylbenzene, 50 parts of 1,2,4-trichlorobenzene and 1,1,2,2-tetrachloroethane were charged into the reaction kettle. The total reaction time was 3¾ hours and the reaction held at a kettle temperature of 173–187° C.

The polymer which was precipitated from acetone was a white solid having a softening point of about 150° C. and gave clear melt at 200° C.

Example IV

This example illustrates the preparation and some of the properties of a resinnous product obtained from 1,4-bis(chloromethyl tetramethylbenzene and pentanedithiol-1,5 prepared by fusion technique.

8.20 parts of pentanedithiol-1,5 and 13.86 parts of bis(chloromethyl) tetramethylbenzene were placed in a reaction flask equipped with a gas inlet tube and condenser. The flask was heated slowly up to about 175° C. Nitrogen was bubbled through the mixture during the reaction. Hydrogen chloride started to come off immediately and after the temperature had reached 175° C. the mixture had formed a slight tan viscous liquid which hardened on cooling. The resin had a softening point of 75° C. Analysis: Sulfur=20.9, Cl=0.29, M.W. 3840. On dissolving in a solvent and reprecipitating the S.P. was raised to 100–103° C.

A portion of the resin produced above was melted and drawn out into fine fibers.

Fibers having related properties are obtained by substituting 1,4-bis(chloromethyl) tetraisopropylbenzene and 1,4-bis(chloromethyl) tetraethylbenzene for the 1,4-bis-(chloromethyl) tetramethylbenzene in the above process.

*Example V*

This example illustrates the preparation by the fusion process and some of the properties of a resinous product obtained from a mixture of pentanedithiol-1,5 and butanedithiol-1,4 with 1,4-bis(chloromethyl) tetramethylbenzene.

2.44 parts of butanedithiol-1,4 and 8.2 parts of pentanedithiol-1,5 were mixed with 18.48 parts of 1,4-bis(chloromethyl) tetramethylbenzene in a reaction flask equipped with a gas inlet tube and condenser. The flask was slowly heated up to 180° C. over a period of about 4¼ hours. Nitrogen was bubbled through the mixture during the reaction. At the end of the heating period, the product was a heavy viscous resin which solidified on cooling to a clear colorless solid. Sulfur 21.5%, mol. wt. 4126. Calc.=21.9%, Cl=0.93%. The resin produced as described above could be cold drawn to produce very long fibers. By heating the above resin under a high vacuum, the molecular weight was increased to 11,000. Fibers drawn from this material were strong and flexible.

Solutions of the above resin in chloroform gave clear homogeneous films when plated on glass. On baking at 75° C. for 16 hours the films were hard and durable.

*Example VI*

This example illustrates the preparation and some of the properties of a resinous product obtained from 1,6-hexanedithiol and 1,4-bis(chloromethyl) tetramethylbenzene.

300 parts of 1,6-hexanedithiol and 460 parts of bis-(chloromethyl) tetramethylbenzene are placed in a reaction flask as described in Example V and the flask heated slowly up to 185° C. Nitrogen is bubbled through the mixture during the reaction. After the temperature had reached 185° C. the mixture forms a viscous light tan liquid which hardens on cooling. This resin can be melted and drawn out to form strong pliable fibers. Solutions of the resin in chloroform give films which, on baking at 75° C. for one hour, are hard and durable.

Fibers having related properties are obtained by substituting bis(chloromethyl) tetraisopropylbenzene and bis-(chloromethyl) tetrabutylbenzene for the bis(chloromethyl) tetramethylbenzene in the above process.

*Example VII*

This example illustrates the preparation of a low molecular weight resinous product from pentanedithiol-1,5 and bis(chloromethyl) durene and the further reaction of this resin with more bis(chloromethyl) tetramethylbenzene and butanedithiol-1,4 to form a high molecular weight block copolymer.

6.8 parts of pentanedithiol-1,5 (.05 mole) and 13.86 parts of bis(chloromethyl) tetramethylbenzene were placed in the reaction kettle described in Example V. The flask was heated to 160–170° C. and held in that range for three hours. Nitrogen was bubbled through the mixture during the reaction. At the end of the heating period, the mixture appeared as a slightly viscous resin.

To the viscous resin prepared as above was added 6.23 parts of butanedithiol-1,4 (.05 mole) and 8.24 parts of bis(chloromethyl) tetramethylbenzene (.04 mole). This mixture was heated at 163° C. for several hours and then the temperature raised to 197° C. and held there for about 6 more hours. During the heating period, fibers which were silky in appearance could be drawn from the hot melt. At the end of the heating period, the product solidified on cooling to form a hard resin. Fibers drawn from this resin had a dull appearance. Solutions of the above resin in hot chloroform gave clear homogeneous films which, on baking at 75° C., are hard and durable.

Related resins are obtained by replacing the tetramethylene dithiol in the latter part of the preparation process with equivalent amounts of each of the following: 1,6-hexanedithiol, 1,6-cyclohexanedithiol, propanedithiol and 6-thia-1,8-octanedithiol.

*Example VIII*

This example illustrates the preparation of a resinous product by reacting 1,5-pentanedithiol with bis(acetoxymethyl) tetramethylbenzene.

2.78 parts of bis(acetoxymethyl) tetramethylbenzene and 1.36 parts of 1,5-pentanedithiol were placed in a reaction flask equipped with a gas inlet tube reaching almost to the bottom. The flask was heated at 185° C. for five hours. Nitrogen was bubbled through the mixture during the reaction. At the end of the heating period, the mixture appeared as a pale honey colored viscous liquid which hardened on cooling.

A portion of the resin produced above could be easily drawn into fibers that were some of the toughest fibers obtained. Chloroform solutions of the resin could also be used to form hard baked films as shown in Example VI.

Related resins are obtained by replacing the 1,5-pentanedithiol in the above preparation process with equivalent amounts of each of the following: 1,4-butanedithiol, mixtures of 1,6-hexanedithiol and 1,4-butanedithiol and 1,8-octanedithiol.

*Example IX*

This example illustrates the preparation of a resinous product by reacting bis(chloromethyl) tetramethylbenzene with a polymercapto-substituted reaction product of 2,2-bis(epoxypropoxyphenyl) propane and hydrogen sulfide (polymercaptan A described above).

4.56 parts of polymercaptan A and 2.31 parts of bis-(chloromethyl) tetramethylbenzene were mixed in a reaction flask as described in Example I. The flask was heated upwards to 96° C. and held at that temperature for about 6 hours. At the end, the product was a pale yellow solid. This resin was soluble in chloroform. Films of the chloroform solution on baking at 150° C. for 30 minutes were hard and colorless.

*Example X*

This example illustrates the preparation of a resinous product by reacting bis(chloromethyl) tetramethylbenzene with a polymercapto-substituted reaction product of polyallyl glycidyl ether and hydrogen sulfide (polymercaptan B described above).

5.28 parts of polymercaptan B and 2.0 parts of bis-(chloromethyl) tetramethylbenzene were placed in a reaction flask along with 7.0 parts of tetrachloroethane which is used as a solvent for the reaction. The solution was heated to 100° C. to 110° C. When the viscosity of the solution had increased to the point where a film could be formed from the solution, a film was spread on a glass slide and baked at 150° C. for .5 hour. The film was hard and solvent resistant.

*Example XI*

This example illustrates the preparation of a sulfur-containing resinous product wherein the sulfur is in the form of sulfonyl linkages.

10 parts of the sulfur-containing resinous product prepared from a mixture of pentanedithiol and butanedithiol and bis(chloromethyl) tetramethylbenzene as shown in Example V was added to a solution containing 500 parts of a 30% hydrogen peroxide solution and 150 parts of acetic acid and the mixture allowed to stand for one hour at room temperature. The mixture was then heated on the steam bath at 60–70° C. for 4 hours. A solution containing 100 parts of the 30% hydrogen peroxide solution and 200 parts of acetic acid was then slowly added and the mixture heated for one more hour at 60–70° C. The resinous product appeared as a white solid dispersed in the acetic acid solution. Water was added and the mixture filtered. The white precipitate was washed with boiling water, dissolved in boiling phenol and then precipitated in methanol. The white high melting solid had a sulfur content of 15.6% compared to a calculated S content of 15%.

Related resins are obtained by replacing the resinous product of the mixture of pentanedithiol and butanedithiol and bis(chloromethyl) tetramethylbenzene in the above process with equivalent amounts of each of the following: reaction product of pentanedithiol and bis(chloromethyl) tetramethylbenzene, reaction product of pentanedithiol and bis(chloromethyl) tetraisopropylbenzene, the block copolymer as described in Example IV, and a reaction product of hexanedithiol and bis(chloromethyl) tetrabutylbenzene.

I claim as my invention:

1. Sulfur-containing products of the formula

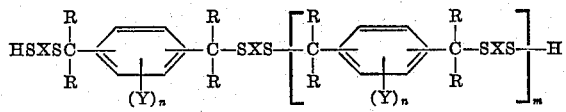

wherein Y is a monovalent hydrocarbon radical containing up to 8 carbon atoms, X is an alkylene radical containing up to 8 carbon atoms, R is hydrogen, $n$ is 3 to 4 and $m$ is an integer from 4 to 50.

2. A sulfur-containing product as in claim 1 wherein the Y is an alkyl radical containing up to 8 carbon atoms, X is a $-(CH_2)_a-$ radical wherein $a$ is an integer from 1 to 8, and $m$ is an integer of 4 to 50.

3. A sulfur-containing polymeric product of the formula

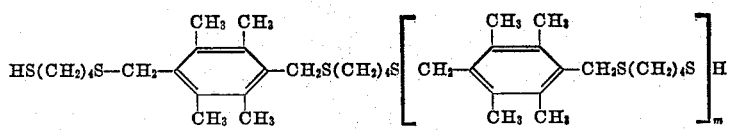

wherein $m$ is an integer of 4 to 50.

4. A sulfur-containing polymeric product of the formula

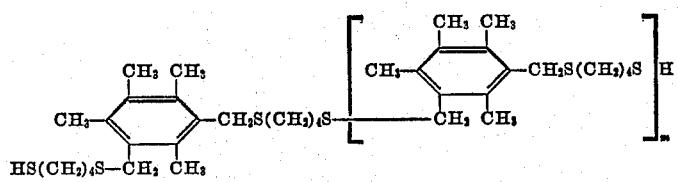

wherein $m$ is an integer of 4 to 50.

5. A sulfur containing product of the group consisting of (1) products of the formula

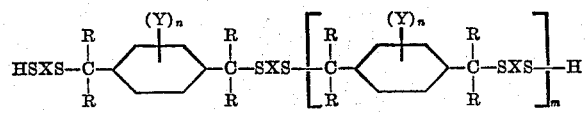

wherein Y is a monovalent hydrocarbon atom radical containing up to 8 carbon atoms, X is a bivalent radical selected from the group consisting of bivalent hydrocarbon radicals, bivalent thiahydrocarbons and oxahydrocarbon radicals, R is a member of the group consisting of hydrogen and alkyl radicals, $n$ is an integer from 3 to 4 and $m$ is an integer from 4 to 50, and (2) products having above-described formula wherein a portion of the —S— groups attached to carbon have been converted to —SO$_2$— radicals by treatment with a peroxide.

6. A process for preparing sulfur-containing resinous products which comprises heating at between 50° and 150° C. a bis(1-chloroalkyl) tetraalkylbenzene wherein the chloroalkyl groups contain up to 6 carbon atoms and the alkyl groups attached to the four ring carbon atoms contain up to 8 carbon atoms, with from 1 to 3 equivalents of a polymercaptan containing from 2 to 4 free SH groups attached to carbon atoms and containing up to 10 carbon atoms.

7. A process as in claim 6 wherein the polymercaptan is 1,5-pentanedithiol.

8. A process as in claim 6 wherein the polymercaptan is 1,4-butanedithiol.

9. A process as in claim 6 wherein the substituted benzene is bis(chloromethyl) tetramethyl benzene and the polymercaptan is 1,6-hexanedithiol.

10. A process as in claim 6 wherein the substituted benzene is bis(chloromethyl) trimethyl benzene and the polymercaptan is 1,5-pentanedithiol.

11. A process as in claim 6 wherein the substituted benzene is bis(chloromethyl) tetrabutyl benzene and the polymercaptan is 1,6-cyclohexanedithiol.

12. A process for preparing sulfur-containing polymeric products which comprises heating and reacting, at a temperature between 50° C. and 250° C., a substituted benzene of the formula

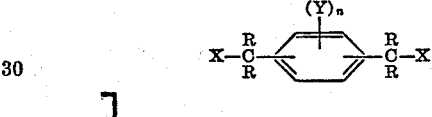

wherein Y is a monovalent hydrocarbon radical containing up to 8 carbon atoms, R is a member of the group consisting of hydrogen and alkyl radicals, X is a member of the group consisting of halogen atoms and alkanoyloxy radicals containing up to 6 carbon atoms, $n$ is an integer from 3 to 4, with a polymercaptan in a chemical equivalent ratio varying from 1.2:1 to 1:1.2, chemical equivalent referring to amount needed to furnish one group designated as X above per mercapto group.

13. A process as in claim 12 wherein the substituted benzene is a bis(chloroalkyl) tetraalkyl benzene.

14. A process as in claim 12 wherein the substituted benzene is a bis(alkanoyloxyalkyl) tetraalkyl benzene.

References Cited in the file of this patent
UNITED STATES PATENTS

| | | |
|---|---|---|
| 2,221,650 | Patrick | Nov. 12, 1940 |
| 2,363,614 | Patrick | Nov. 28, 1944 |
| 2,538,941 | Macallum | Jan. 23, 1951 |
| 2,799,694 | Ross et al. | July 16, 1957 |